(12) United States Patent
Gross et al.

(10) Patent No.: US 6,192,673 B1
(45) Date of Patent: Feb. 27, 2001

(54) METHOD AND APPARATUS FOR IMPROVING THE QUALITY OF EXHAUST GAS EMISSIONS FROM AN INTERNAL COMBUSTION ENGINE

(75) Inventors: Christof Gross, Stuttgart; Klaus Schmidt, Brackenheim, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/184,859

(22) Filed: Nov. 3, 1998

(30) Foreign Application Priority Data

Nov. 3, 1997 (DE) .............................. 197 48 421

(51) Int. Cl.⁷ ...................................... F01N 3/00
(52) U.S. Cl. ............................... 60/284; 60/300
(58) Field of Search .................... 60/274, 277, 284, 60/300; 219/497; 307/10.1

(56) References Cited

U.S. PATENT DOCUMENTS

| | | | |
|---|---|---|---|
| 5,224,335 | * 7/1993 | Yoshizaki | 60/300 |
| 5,323,607 | * 6/1994 | Tanaka et al. | 60/274 |
| 5,390,493 | * 2/1995 | Fujishita et al. | 60/284 |
| 5,512,789 | * 4/1996 | Lyon | 307/10.1 |
| 5,645,745 | * 7/1997 | Hartwick et al. | 219/497 |
| 5,966,931 | * 10/1999 | Yoshizaki et al. | 60/284 |

FOREIGN PATENT DOCUMENTS

| | | |
|---|---|---|
| 39 39 068 C2 | 5/1991 | (DE) . |
| 40 42 347 A1 | 11/1991 | (DE) . |
| 43 35 711 C1 | 11/1994 | (DE) . |
| 43 35 771 C1 | 3/1995 | (DE) . |

* cited by examiner

Primary Examiner—Thomas Denion
Assistant Examiner—Tu M. Nguyen
(74) Attorney, Agent, or Firm—Evenson, McKeown, Edwards & Lenahan, P.L.L.C.

(57) ABSTRACT

A method for improving the exhaust gas emissions of an internal combustion engine having an exhaust gas catalyst, wherein the exhaust gas catalyst is heated after starting the internal combustion engine. Regulation of the power output is performed by the generator or generators during the warm-up phase of the exhaust gas catalyst. The power output of the generator or generators is regulated such that this power output is reduced during a period of time until the exhaust gas catalyst has reached a specific minimum temperature.

6 Claims, 2 Drawing Sheets

METHOD AND APPARATUS FOR IMPROVING THE QUALITY OF EXHAUST GAS EMISSIONS FROM AN INTERNAL COMBUSTION ENGINE

BACKGROUND AND SUMMARY OF THE INVENTION

This application claims the priority of German application, filed Mar. 11, 1997, the disclosure of which is expressly incorporated by reference herein.

The present invention relates to a method and apparatus for improving the quality of exhaust gas emissions from an internal combustion engine having an exhaust catalyst which is heated after the engine is started, and the power output of the generator is reduced during this warm-up phase of the exhaust catalyst until the exhaust catalyst has reached a specific minimum temperature. The attainment of the operating temperature can be detected, for example, by measuring the temperature or by also evaluating the time the heating system takes to turn on.

German Patent Document DE 39 39 068 C2 discloses a method of this kind, in which the catalyst heater is separated from the generator and is operated only by the battery during the warm-up phase of the catalyst. Since the heater is turned on for a relatively short period of time, the load on the battery will not be excessive. As a result, exhaust gas emissions improve, since the load on the engine is relieved by the reduction of the drain on the generator. Cleaning of the exhaust by the catalyst does not begin until the exhaust catalyst has reached its operating temperature. The specific minimum temperature is therefore this operating temperature, or one that is slightly lower. To achieve this result, it is also known to provide a plurality of generators of which only one is in operation during the warm-up phase of the exhaust catalyst.

German Patent Document DE 43 35 771 C1 also discloses a method in which a heater heats the exhaust catalyst during the warm-up phase of the exhaust catalyst because this heater is supplied with electrical energy. Since this heater (operated by electrical energy) is a comparatively heavy load upon the generator, the power output of the generator is increased in order to keep the load placed on the batteries by the heater within predefined limits. Further, the exhaust catalyst should reach its working temperature as quickly as possible. This is so that the exhaust catalyst can serve its purpose and improve the exhaust gas emissions of the internal combustion engine as early as possible during the operation of the internal combustion engine. To cover the power demanded by the heater the generator is regulated so that, in the warm-up phase of the exhaust catalyst, the power output of the generator is increased.

An object of the present invention is to improve the exhaust gas emissions of an internal combustion engine, while at the same time limiting the load on the battery system.

This and other objectives and advantages are achieved by the method according to the invention, in which during the warm-up phase the power output of the generator is adjusted by reducing the power output of the generator by an intervention into the latter such that it is greater than 0, while the power with respect to normal operation is reduced after the warm-up phase. The intervention can be made, for example, by electrically deactivating the generator.

In comparison to the procedure disclosed in German Patent Document DE 39 39 068 C2, where support for the battery by a residual power of a generator is provided by using a generator system which consists of several generators, during the warm-up phase of the present invention only one of the generators is in operation. This provides an advantage in the method according to the present invention in that only one generator is needed as a component, where the power of this one component is appropriately adjusted.

From German patent document DE 40 42 347 A1, it is known to reduce the power output of the generator until the internal combustion engine has reached its operating temperature. This measure is intended to serve as a method for avoiding rough operation of the internal combustion engine. Here, no mention is made of reducing exhaust gas emissions. Since the disclosure of DE 40 42 347 is directed to the operating temperature of the internal combustion engine and not the operating temperature of the exhaust gas catalyst, DE 40 42 347 is directed to a different purpose than the present disclosed invention.

Thus, in accordance with the objectives of the invention, the load on the internal combustion engine is reduced until this operating temperature is reached. By reducing the load on the internal combustion engine, the pollutant output of the internal combustion engine is reduced until the exhaust gas catalyst intervenes.

The heating capacity of the exhaust gas catalyst's heater is assisted, for example, by a battery which is recharged when the exhaust gas catalyst has reached its operating temperature. As a result of this method, at least under certain conditions of operation during sufficient periods of time in which the battery is charged, an improvement of the overall balance of the exhaust gas emissions is achieved. Excessive discharging of the battery is advantageously avoided because to a certain extent the generator is still supplying power.

In the method according to an embodiment of the invention, the generator's output is regulated such that it does not drop below certain on-board line voltage limits.

Thus a guarantee of the operation of other electrical devices is advantageously assured. This is especially significant in safety-related functions, such as for example, the airbag or an antilock brake system for the wheels of the vehicle.

Likewise, in order to reduce the total current demand up to the time that the exhaust gas catalyst reaches its operating temperature, it is also contemplated to reduce the number of engaged electrical devices according to their importance to the safe operation of the motor vehicle. Various methods are known for reducing the power consumption of electrical devices in a motor vehicle in which easing the battery load is of primary importance. The procedure used in these methods might also be applied at this point to the method described hereinabove.

Other objectives, advantages and novel features of the present invention will become apparent from the following detailed description of the invention when considered in conjunction with the accompanying drawings.

DETAILED DESCRIPTION OF THE DRAWINGS

Figure 1:
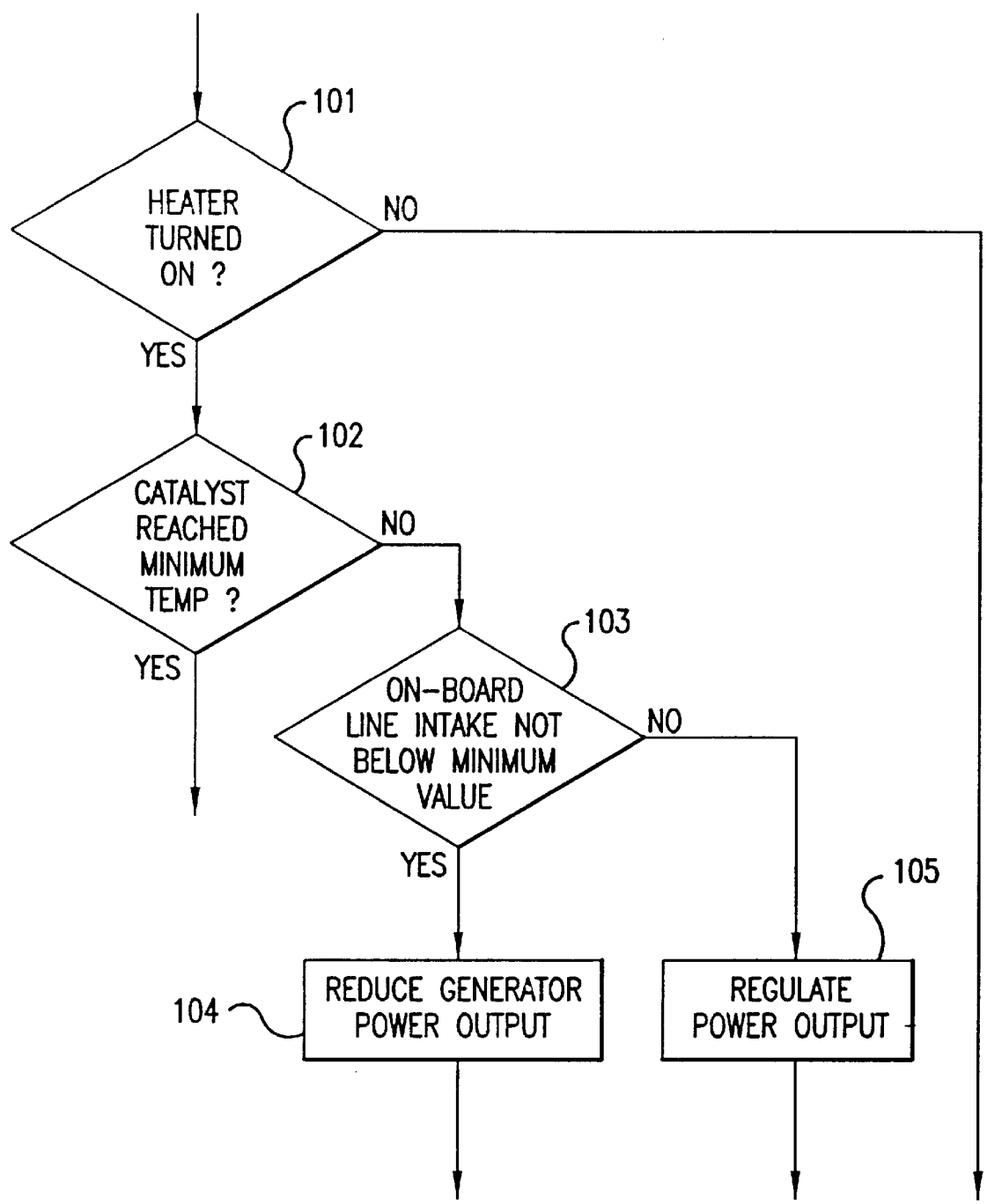
FIG. 1 shows a flow chart of the method according to the invention.

As shown by the flow chart in FIG. 1, first it is determined in step 101 whether the heater of the exhaust gas catalyst is activated after the internal combustion engine is started. If this is not the case, the execution of the process is terminated.

Otherwise there is a transition to step 102, wherein it is determined whether or not the exhaust gas catalyst has reached its specific minimum temperature. For this purpose the temperature of the exhaust gas catalyst can be measured and evaluated, for example. It is also possible to arrive at the temperature of the exhaust gas catalyst on the basis of the length of time the heater is activated.

If it is found in step 102 that the specific minimum temperature has been reached, the execution of the process is terminated. Otherwise a transition to step 103 occurs, in which the on-board line voltage is checked to see whether the on-board line voltage has not fallen below a specific minimum.

If the on-board line voltage has not fallen below this specific minimum a transition to step 104 takes place, in which the power output of the generator is reduced. This can be accomplished by electrically deactivating the generator.

If the on-board line voltage has fallen below the specific minimum a transition to step 105 occurs, in which the power output of the generator is regulated such that the on-board line voltage again exceeds the minimum on-board line voltage. Thus the functioning of other electrical devices can be advantageously sustained.

Figure 2:
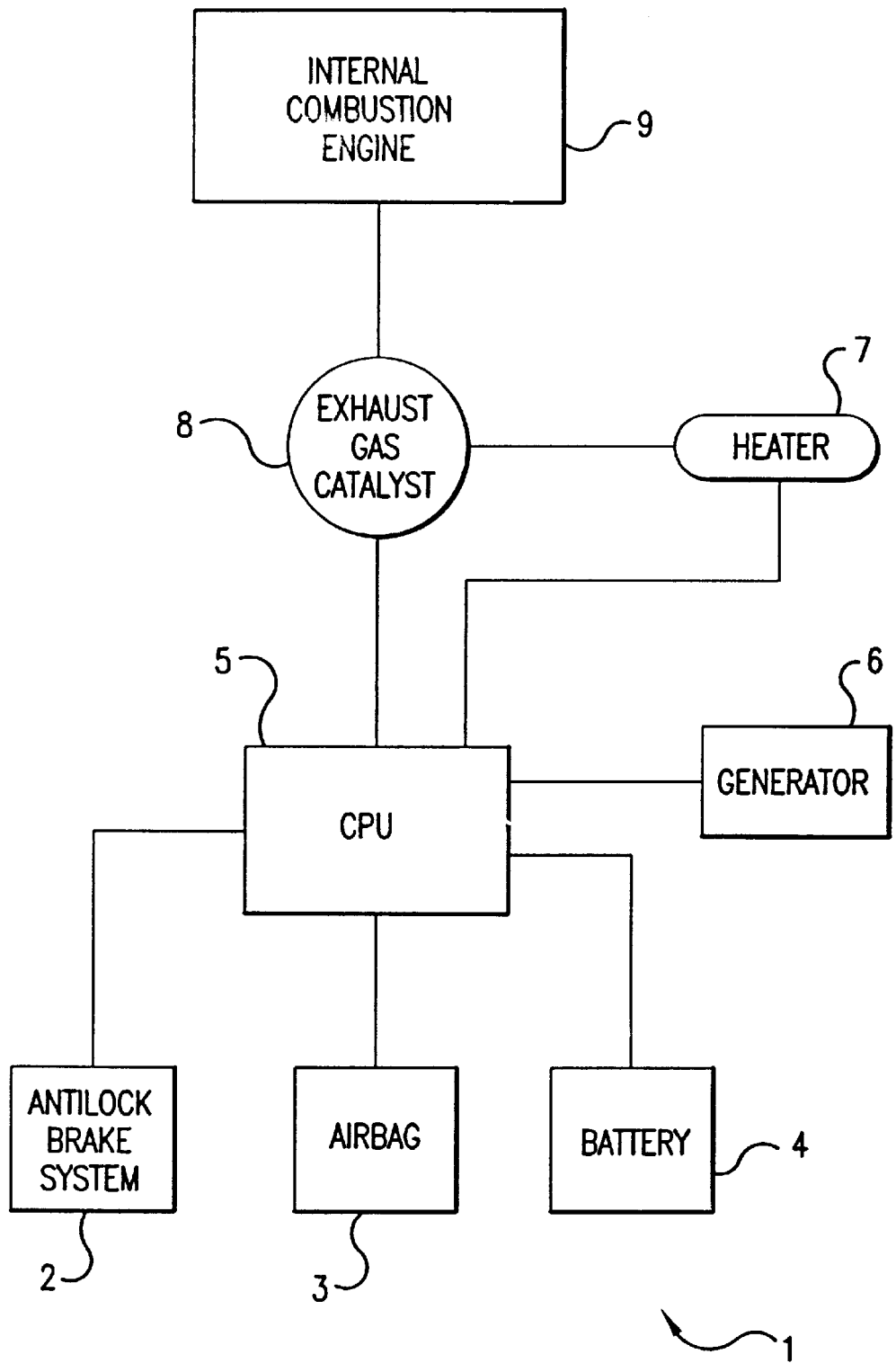
FIG. 2 is a schematic block diagram of an apparatus used to implement the method according to the invention.

The process represented in FIG. 1 can be the program of a programmable control apparatus which is performed cyclically. A system 1 used to cyclically implement the process is shown in FIG. 2. Here, a computer processing unit 5 (CPU), for example, contains the program. The CPU can be a microprocessor or a microcontroller, for example. Coupled to the CPU 5 is an exhaust catalytic converter 8. Further shown in FIG. 2 is a heater 7 which heats the exhaust catalyst 8 during its warm-up phase.

For illustrative purposes, an automobile engine 9 is shown connected to the catalyst (i.e., mechanically, for example). A generator 6 is coupled to the CPU 5 and is controlled thereby. A battery 4 is also coupled to the CPU 5 for supplying power to the system to thereby operate various systems, for example.

By regulating the generator 6, the load on the internal combustion engine 9 is reduced until the operating temperature is reached. By the reduction of the load on the internal combustion engine, the pollutant output of the internal combustion engine is reduced until the exhaust gas catalyst intervenes. Furthermore, excessive loads on the battery 4 are avoided because the generator is still supplying power to other electrical systems in the vehicle. This guarantees the operation of other systems, especially safety systems (for example, an airbag 2, an antilock brake system 3), in the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for improving exhaust gas emissions of an internal combustion engine having an exhaust gas catalyst, comprising the acts of:

heating the exhaust gas catalyst after starting the internal combustion engine; and reducing a power output of a generator during a warm-up phase of the exhaust gas catalyst until the exhaust gas catalyst has reached a minimum operating temperature;

wherein the step of reducing the power output of the generator during the warm-up phase includes the step of adjusting the power output so that the power output has a value greater than zero and less than a power output of said generator during normal operation occurring after the warm-up phase.

2. The method according to claim 1, further comprising the act of:

regulating the power output of the generator such that the power output does not reach a lower limit of an onboard line voltage.

3. An apparatus for improving exhaust gas emissions of an internal combustion engine having an exhaust gas catalyst, comprising:

at least one generator;

a CPU operatively coupled to the generator for controlling a power output of the generator;

a battery operatively coupled to the CPU for supplying system power to the CPU; and a heater operatively coupled to the CPU for heating the exhaust gas catalyst to control the heating of the exhaust gas catalyst, wherein the CPU provides, during the warm-up phase, an adjustment of the power output of the generator so that the power output has a value greater than zero and less than a power output of said generator during normal operation occurring after the warm-up phase.

4. The apparatus according to claim 3, wherein one of an antilock brake system and an air bag is operatively coupled to the CPU.

5. The apparatus according to claim 3, wherein the generator power output is regulated such that the power output does not reach a specific lower limit of the on-board line voltage.

6. The apparatus according to claim 5, wherein one of an antilock brake system and an air bag is operatively coupled to the CPU.

* * * * *